May 31, 1960 K. C. S. AASTED 2,938,621
MOULD HOLDER FOR CHOCOLATE MOULDING PLANTS
Filed July 29, 1958 2 Sheets-Sheet 1
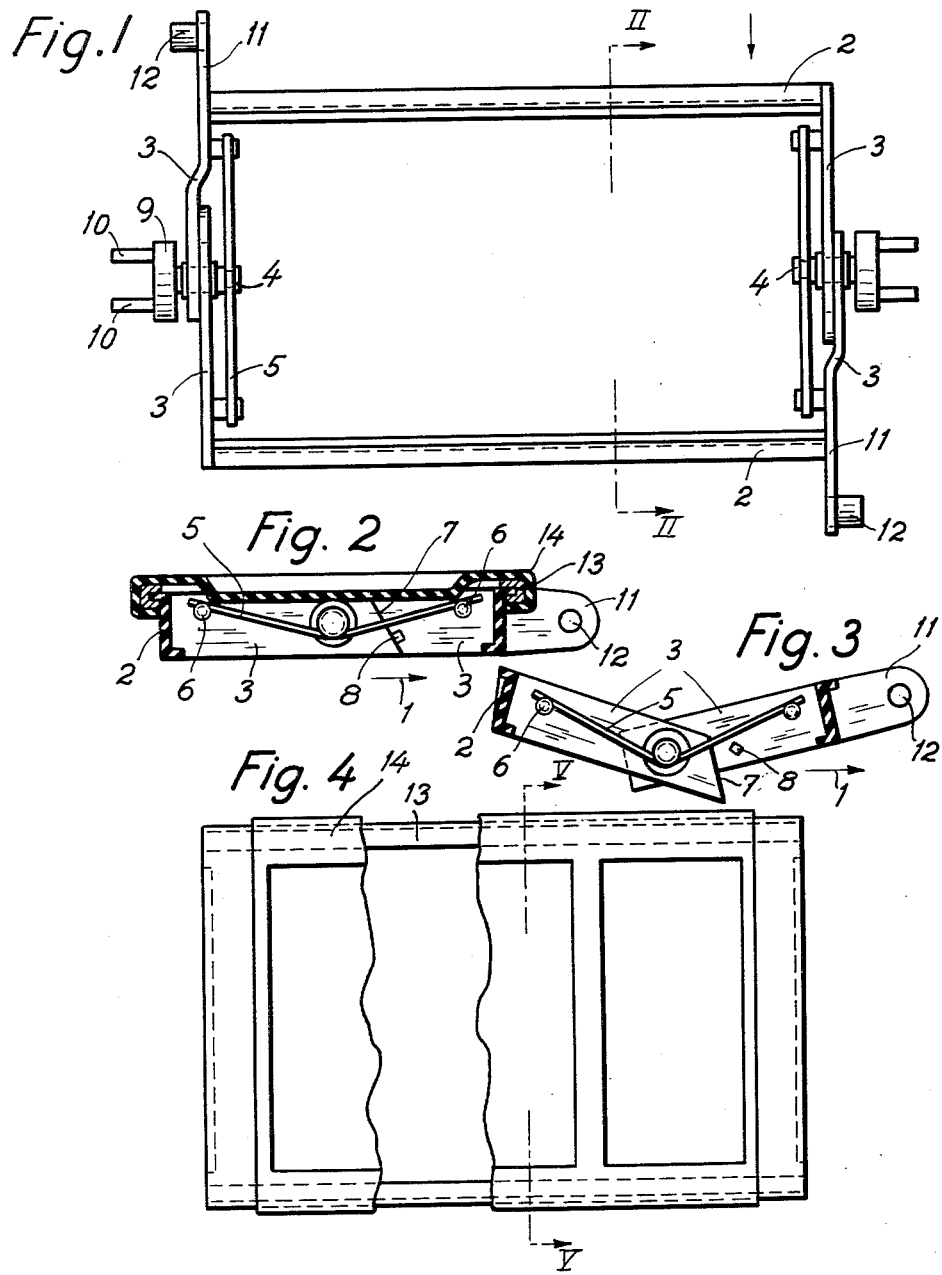

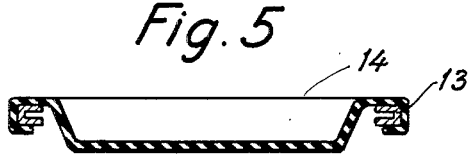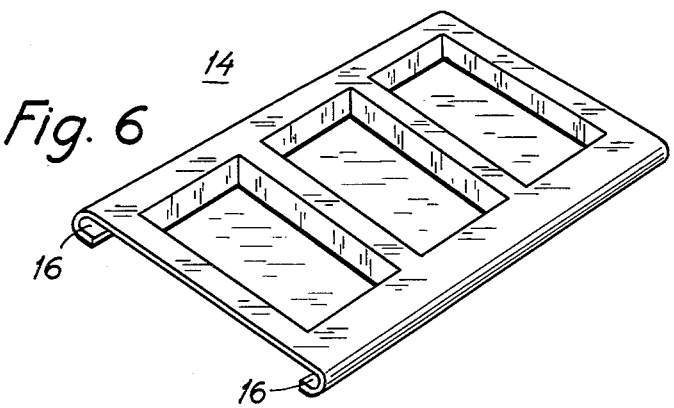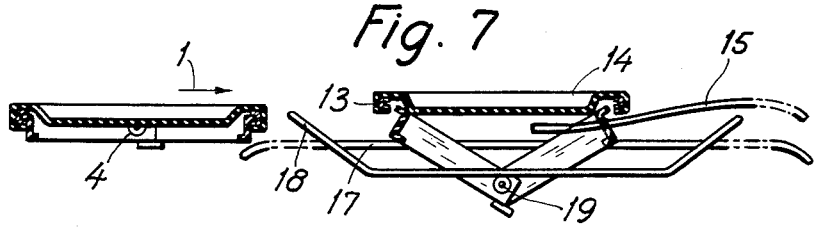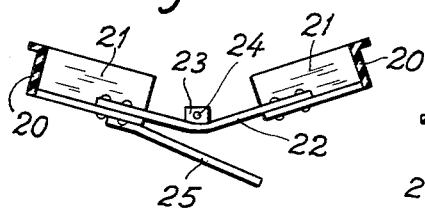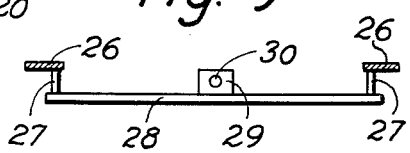

United States Patent Office 2,938,621
Patented May 31, 1960

2,938,621

MOULD HOLDER FOR CHOCOLATE MOULDING PLANTS

Kai Christian Sophus Aasted, 25 Blegdamsvej, Copenhagen, Denmark

Filed July 29, 1958, Ser. No. 751,767

4 Claims. (Cl. 198—131)

The invention relates to a mould holder in endless chain systems of chocolate moulding plants whereby the moulds are fitted in holders arranged on the chains. The mould holder is suspended at either end by means of a pin in a link of one of the two chains moving synchronously in the plant for the forwarding of the individual mould holders and being placed on either side of same.

Normally the mould holders are designed with a view to enabling rapid and convenient exchange of the chocolate moulds. The mould holder is frequently composed of a frame, the transverse members of which in relation to the direction of motion are provided with grooves at the inside into which grooves the moulds are inserted. The moulds are inserted by pushing.

This type of frame members does not enable automatic opening of same so that the mould can be taken out right away since the opening as well as the taking out must be effected by hand.

In order that this drawback may be overcome, mould holders have already been suggested by which automatic opening and closing at a definite point in the moulding plant are provided.

In this connection mould holders for endless chain systems in chocolate moulding plants have already been suggested which are composed of a spring-loaded pair of holding elements catching the chocolate mould at opposite catching points such as ribs, gripping rails and the like, with clamping motion from within similar to that of a pair of tongs, the said pair of holding elements being in connection with two pivoted levers arranged round a common swivel axle in the middle longitudinal section of the mould forwarding path and tending to keep them clamped against the said spring-load, the pivoting range of the aforementioned levers being limited between two terminal positions, viz. an inner position at which the moulds are released from their holder, and an outer position extending over the clamping range in both expanding directions.

According to the invention it is suggested in order to simplify the construction and bring about a more adequate shape of same to design the holding elements as holding rails arranged transversely to the chain travel direction on a pair of levers capable of being snubbed or pivoted from an outer gripping position inwards against the tensile or compressive force of a spring, the said holding rails operating together with counter rails mounted rigidly on the chocolate mould within a ground plan of its cover surface, and the said holding rails and counter rails overlapping each other in the way of claws.

According to the invention the mould holder proper may be provided with spring or stop devices tending to keep or bring it into the stretched position, so that the plant need only have separate devices to influence the position of the mould holder within the range in which the mould holder must be collapsed.

According to the invention the mould holder may further be collapsible around two pins with a common spindle, whereby the pins may be connected in the usual manner with links of the conveying chains. The collapsing may also be effected through bending of built-in spring lamellae. In such case the longitudinal holding elements, i.e. the levers, can be replaced entirely with spring lamellae.

The drawing shows various constructional embodiments for the mould holder according to the invention:

Figure 1 shows a top view of a mould holder,

Figure 2 shows a section on line II—II of Figure 1 through the mould holder with the mould mounted in place, Figure 3 shows a corresponding section through the mould holder in its collapsed position, Figure 4 shows a top view of a mould frame with mounted mould, Figure 5 shows a section through same on line V—V of Figure 4, Figure 6 shows a perspective view of the chocolate mould proper, Figure 7 shows a section through a couple of mould holders with mould in connection with the fixed elements in the machine which cause the mould holder to collapse and stretch out, Figure 8 shows a second constructional embodiment for the mould holder, and Figure 9 a third embodiment for same.

The mould holder shown in Figures 1–3 moves through the machine in the direction indicated by the arrow 1 (Figure 7) and is composed of a frame, the members 2 across the direction of motion are made from Z-iron, while the members along the direction of motion each are divided in two parts 3 made from flat iron and connected by means of a pivot 4. This pivot is wound with a leaf spring 5 tending to move the holder into the position shown in Figure 2, while the ends of the spring are passed over two pins 6 to each of the holding members 3. In the said position an inclined end section 7 on one member meets a projection 8 on the other, thereby preventing that the mould holder can be turned beyond this position. The pivot 4 is fitted outside to a block 9 provided with a couple of pins 10 which are taken up by the conveying chain travelling along the side in question of the mould holder, the said chain conveying the mould holders in succession through the whole plant, being, however, not shown in the drawing.

In two opposite corners the mould holder has projecting arms 11 with guide pins to operate together with guide elements in the plant which are not shown, and which serve to control and possibly change the angular position of the mould holder in the space.

As shown in Figure 2, the mould holder carries a mould frame which has two channel iron sections 13 opening inwards which can be engaged by the corresponding Z-rail through its upper flange to hold the mould frame and the mould 14 fitted on it. One mould is shown in Figure 6. When the mould holder collapses into the position shown in Figure 3 it is released from the mould frame 13, and this can now be removed right away along with the moulds fitted on it.

If it is desired also to remove the mould 14, which comprises the frame 13 with U-shaped grooves 16, from the frame, then it should be pushed beyond one end of the mould holder.

At the point in the plant where the mould frames are to be detached from the mould holders the latter run on to a guide rail 17, which is shown in Figure 7, whereupon their pivots 4 are intercepted by a corresponding rail 18 on either side of the plant depressing the pivot into the position 19, where the mould holder is collapsed for the purpose of releasing the mould frame 13 and the mold 14 fitted on same. The mould frames are removed by hand, or they slide upwards on a separate path, and fresh moulds may be mounted before the pivot 4 leaves the rail 18, and before the mould holder is caused to stretch out by the spring 5 which is not shown in Figure 7.

Figures 8 and 9 show two further embodiments for the mould holder.

The mould holder shown in Figure 8 is composed of two rails 20 with inverted L-section. They are connected at either end with cross members 21 which are connected in pairs by means of a lamella spring carrying in its centre a block 23 with a pin 24 secured on a block corresponding to the block 9 in Figure 1. In Figure 8 the mould holder is shown in its collapsed position. As soon as it is allowed to stretch under the influence of the springs 22, a pawl lever 25 at one of the members 21 will push against the lower surface of the other member, thereby preventing the mould holder from travelling beyond the position in which the rails 20 are at the greatest distance from one another.

The mould holder shown in Figure 9 is composed of two horizontal, belt-shaped rails 26 which by means of bolts 27 are connected with the ends of a couple of lamella springs 28 of the same kind as the spring 22, however, essentially longer than this. The springs 28, too, one of which only is shown in the drawing, are provided in the centre with blocks 29 with pins 30, by which the mould holder is suspended. The springs 28 are so arranged that, when no particular action is exerted to cause the mould holder to open, they will keep the rails 26 in place in the grooves of the mould frame 13 in question.

As a matter of fact, the mould holder can be designed in numerous other ways within the scope of the invention.

What I claim and desire to secure by Letters Patent is:

1. A mold carrier adapted to be supported between a pair of parallel spaced chains in a chocolate molding plant and comprising a pair of holding bars extending transversely of the chains adapted to engage with a chocolate mold to hold said mold on said carrier, each of said holding bars being connected to at least one pair of levers having pivoted arms, resilient means normally holding said arms in substantially colinear position, and means carried by said levers adapted upon engagement with guiding means to urge said arms to pivot away from said colinear position against said resilient means to release said mold.

2. A mold carrier adapted to be supported between a pair of parallel spaced chain in a chocolate molding plant and comprising a pair of holding bars extending transversely of the chains adapted to engage with a chocolate mold to hold said mold on said carrier, each of said holding bars being connected to at least one pair of levers having pivoted arms, resilient means normally holding said arms in substantially colinear position, means limiting the action of said resilient means, and means carried by said levers adapted upon engagement with guiding means to urge said arms to pivot away from said colinear position against said resilient means to release said mold.

3. A mold carrier adapted to be supported between a pair of parallel spaced chains in a chocolate molding plant and comprising a pair of holding bars extending transversely of the chains adapted to engage with a chocolate mold to hold said mold on said carrier, each of said holding bars being connected to at least one pair of levers having pivoted arms, resilient means integral with said arms normally holding said arms in substantially colinear position, and means carried by said levers adapted upon engagement with guiding means to urge said arms to pivot away from said colinear position to release said mold.

4. A mold carrier adapted to be supported between a pair of parallel spaced chains in a chocolate molding plant and comprising a pair of holding bars extending transversely of the chains adapted to engage with a chocolate mold to hold said mold on said carrier, each of said holding bars being connected to a pair of laterally spaced apart levers and the pair of levers connected to one holding bar being pivotally interconnected with the pair of levers connected to the other holding bar, resilient means normally holding said levers in colinear position, and means carried by said levers adapted upon engagement with guiding means to urge said levers to pivot away from said colinear position against the action of said resilient means to release said mold.

References Cited in the file of this patent
UNITED STATES PATENTS

| | | |
|---|---|---|
| 604,973 | Dinkey | May 31, 1898 |
| 2,192,359 | Lombard | Mar. 5, 1940 |

FOREIGN PATENTS

| | | |
|---|---|---|
| 688,432 | Great Britain | Mar. 4, 1953 |
| 1,044,219 | France | June 17, 1953 |